Patented Oct. 26, 1937

2,097,292

UNITED STATES PATENT OFFICE 2,097,292

PROCESS OF MANUFACTURING YEAST

Edmund Leith Kitzmeyer, Bloomfield, N. J.

No Drawing. Application October 14, 1933, Serial No. 693,671

2 Claims. (Cl. 195—94)

This invention relates to a process of manufacturing yeast, particularly baker's yeast, which will produce high yields of yeast of excellent quality.

Many commercial yeasts as now prepared are characterized by a certain amount of grittiness. Such yeasts are ordinarily pressed to get them in proper condition for commercial distribution. During and after distribution, and before they are used by the ultimate consumer, such as a baker, for example, they will often be subjected to a certain amount of aging, warming and drying. The baker dissolves the yeast in water, and if it has been subjected to the various conditions just mentioned it frequently happens that some of the particles of yeast will refuse to soften and form a homogeneous suspension, but will remain, to some extent, in hard lumps at the bottom of the liquid. This grittiness is an attribute which is highly objectionable.

A feature of the yeast produced by my process is that it is free from grittiness. That is, under normal conditions of storing, etc., before use, it will still readily form a homogeneous suspension in water.

Other features of the yeast produced by my process are that it has excellent baking qualities, showing unusual strength in doughs of high sugar content; it is unusually active in fermentation of sugar solution; and it has exceptional keeping qualities, and may be stored for a longer time before use than yeasts manufactured in accordance with present methods.

Another feature of my new process is that it may be practised efficiently and economically, as it requires a minimum of supervision and no experimentation during the process of manufacture, and may be performed with relatively unskilled personnel.

In the manufacture of yeast in accordance with present practices, a wort is prepared which consists of a nitrogen supplying solution, a sugar solution, and a phosphate. This is placed in a vat with a quantity of seed yeast. Additional quantities of peptone and sugar are added from time to time as required for the propagation of yeast cells, and the entire contents of the vat is aerated continuously during the process. In accordance with the teachings of Rainer in German Patent No. 10,135 of 1879, a "peptone", or nitrogen supplying solution, is added continuously or at intervals and the sugar solution is added at widely spaced intervals. In accordance with the teachings of Hayduck in U. S. Patent No. 1,449,105 a wort of 12° balling containing all essential yeast nutrients is added continuously to an original wort of about 1° balling.

In accordance with another method of the prior art varying quantities of a sugar solution are added at intervals.

In accordance with my process, I prepare a fermenter of from 0.5° to 3.0° balling, and add a nitrogen supplying solution either continuously or repeatedly during fermentation, as has been done by others. But I add a sugar solution of about 3° to 5° balling at irregular intervals in accordance with a specific program, as will be more fully disclosed hereinafter.

In practising my invention, I prepare a nitrogen supplying solution preferably in the manner disclosed in United States Patent No. 1,123,920, issued January 5, 1915, to Alfred Pollak. This preparation is made by repeated additions of ammonium hydroxide to a lactic acid souring mash of material containing malt, malt sprouts, corn, or other cereal, or some other economical source of nitrogen and carbohydrates. The lactic acid bacilli are permitted to act until essentially all of the sugar has been converted to acid. To this may be added phosphoric acid or other source of phosphate, if desired. Part of this nitrogenous material and phosphate may be used with sugar to set a fermenter at a concentration of from 0.5° to 3.0° balling. Seed yeast may then be added and fermentation begun with aeration. After the fermenter is set I wait for an interval of from fifteen minutes to 2 hours before adding further nutrient material. This interval will depend upon conditions of aeration, temperature, and type of yeast desired, as will be understood by those skilled in the art. As before stated, nitrogenous material may be added continuously or repeatedly at uniform intervals or at a variant rate, as desired. The fermentation temperature should be kept within a range of from 25 to 33° C.

The sugar which is to be added during the process of fermentation may be obtained from any cheap source of sacchariferous material. I prefer to use molasses because of its economy and ease of handling. The molasses is stored at a dilution of from 30° to 50° balling and maintained at a high temperature for purposes of clarification and sterilization. In my process, I make twenty additions of the sugar material to the fermenter, each consisting of five percent of the total sugar material to be added. As the same quantity of sugar is to be used at each addition, the handling of this quantity is simplified and accuracy of measurement is secured. It may be drawn off in a measuring tank of suitable size from the storage tank, and this tank in turn may have an outlet to the fermenter of suitable size to empty the measuring tank in a brief time. After being drawn off from the storage tank to the measuring tank, the molasses is diluted with ten parts of water to bring the mixture of molasses and water to a proper concentration and temperature for addition to the fermenter.

It will be noted that this procedure may be very easily mechanized and that it obviates the necessity for artificial cooling of the molasses or artificial heating of the water. It also obviates the necessity of large storage tanks required for the sugar additions in processes where dilute solutions are used, and even provides economy of storage space over processes in which worts of less than 30° balling are employed.

After my fermenter has been set, a suitable period of time is allowed to elapse, as above explained, before any sugar solution is added. The nitrogenous material is added continuously or at intervals, as also explained above. My invention consists essentially in the addition of increments of sugar solution at irregular but regulated intervals during the process of fermentation. Although the first addition of sugar solution is not at any precise interval of time after the fermenter has been set, the other additions are at precise intervals. After the first addition, I wait one hour and ten minutes and then make the second addition. After this addition, I wait one hour and five minutes and then make the third addition, and so forth, in accordance with the following table:

| 1–2 | addition | 1 hr. 10 min. |
|---|---|---|
| 2–3 | do | 1 hr. 5 min. |
| 3–4 | do | 45 min. |
| 4–5 | do | 45 min. |
| 5–6 | do | 30 min. |
| 6–7 | do | 30 min. |
| 7–8 | do | 30 min. |
| 8–9 | do | 30 min. |
| 9–10 | do | 30 min. |
| 10–11 | do | 30 min. |
| 11–12 | do | 20 min. |
| 12–13 | do | 20 min. |
| 13–14 | do | 20 min. |
| 14–15 | do | 15 min. |
| 15–16 | do | 15 min. |
| 16–17 | do | 15 min. |
| 17–18 | do | 20 min. |
| 18–19 | do | 20 min. |
| 19–20 | do | 35 min. |

During all of this process, the proper conditions of temperature and aeration are maintained. After the last addition of sugar solution a maturing period is allowed and the yeast is then separated and treated in the usual manner.

It will be seen that the total length of time between my first addition of sugar solution and my last one is nine hours and forty-five minutes and that, therefore, the entire process of manufacture is accomplished in approximately twelve hours. While the exact intervals between successive additions of sugar solution are not extremely critical, the above table should be followed quite closely.

If yeast is prepared by a process in which the sugar solution is added at widely spaced intervals, these additions may be of either large amounts of the solution, or of small amounts. If large amounts are added there is for a time after each addition a large excess of nutrient. This nutrient is attacked rapidly by the cells with the result that a large amount of alcohol is formed, and the yield of yeast is relatively low. Although the product is of reasonably good commercial quality, it is inferior to that produced by my process in keeping and baking qualities. If small amounts of sugar solution are added there is for some time before each addition a period in which there is an absence of fermentable nutrient. The product produced in this case is of relatively poor commercial quality.

If yeast is prepared by a process in which a continuous feed of sugar solution is used, there is some readily available fermentable nutrient available to the yeast cells at all times. The resulting product is of relatively good commercial quality, but is characterized by a certain amount of grittiness, and is inferior in keeping and baking qualities to yeast prepared by my process.

If yeast is prepared by a process in which variant amounts of sugar solution are added the resulting product is of low yield or of inferior quality.

My invention is predicated upon the discovery that the yeast cells attack the nutrient sugar solution at a varying rate during the process of fermentation. It is therefore possible by my process, by adding equal quantities of sugar solution at intervals of time which are spaced in proportion to the rate of attack of the cells, to avoid large excesses of nutrient, continuous excess of nutrient, or substantial intervals in which there is an absence of nutrient. Some one or more of these conditions will occur in all of the prior art processes described above.

The rate of attack of the sugar solution by the yeast cells depends upon temperatures, rate of aeration, quantity and strength of the original fermenter, quantity and type of seed yeast quantity and strength of sugar solution present at any particular time, and, to a lesser extent, upon other factors. Most commercial processes at present in use are substantially standardized. The above table has been worked out to strike an average of such processes, and the intervals are sufficiently flexible so that if the conditions of temperature, strength, etc., which I have given are followed, it may be used under other conditions which are standard for the production of yeast in accordance with any usual present commercial practise. My invention may be adapted to any conditions by testing for the depletion of the sugar solution from time to time, in accordance with known methods, and working out a table similar to the one given herein best suited to those particular conditions.

The improvement in the product produced by my process is probably due to the fact that the conditions for propagation of yeast in accordance therewith more nearly approximate fermentation and growth conditions in natural media than does the present general practise of feeding sugar solution continuously, or the other practises mentioned. In accordance with the present methods of continuously adding sugar solution an artificial sugar concentration is maintained at all times, while in my process there is a sudden source of sugar material which is depleted both in the formation of alcohol and in the growth of the yeast cells. There is thus for a time an excess of fermentable nutrient, then a rapid depletion of this material as it is attacked by the yeast cells, and a brief period in which there is no sugar material which is at all times readily available. This period is just long enough to assure complete consumption of the previous addition of sugar solution. The acidity of the fermenter in terms of pH is subjected in my process to a series of non-harmful fluctuations within a narrow range. These conditions with their associated biological activities of the yeast are not present when a continuous feed of sugar is used. With a continuous feed of sugar there is always present in the fermenter a small amount of readily fermentable sugar the concentration of which changes at relatively only a slow rate, while in my process the change of sugar concentration in the fermenter is at a relatively rapid rate. The effects of these and associated differences of nutrient material in the fermenter seem to stimulate the yeast in my process to assume the desirable attributes which characterize yeast manufactured in accordance therewith.

The yield of yeast produced by my process is approximately the same as that produced by the most efficient methods now used. Slightly more alcohol may be produced than with a continuous feed method, but not enough to constitute a serious loss.

I do not encounter in my process the excess alcohol fermentation which occurs in processes in which relatively large amounts of sugar are added to a fermenter.

Due to the facts that little or no ammonium or other salts bearing strong acid radicles are used in this process, and that the raw materials used have large amounts of protein and other buffer materials, I find that no harmful acidity is developed in the fermenter, and that accordingly no artificial neutralization of excess acidity is required in the operation of the process.

What I claim is:

1. The method of manufacturing yeast which comprises propagating yeast in an aerated yeast nutrient solution, and during the period of yeast growth adding equal quantities of sugar at the following intervals between such additions:—

| | | |
|---|---|---|
| 1–2 | addition | 1 hr. 10 min. |
| 2–3 | do | 1 hr. 5 min. |
| 3–4 | do | 45 min. |
| 4–5 | do | 45 min. |
| 5–6 | do | 30 min. |
| 6–7 | do | 30 min. |
| 7–8 | do | 30 min. |
| 8–9 | do | 30 min. |
| 9–10 | do | 30 min. |
| 10–11 | do | 30 min. |
| 11–12 | do | 20 min. |
| 12–13 | do | 20 min. |
| 13–14 | do | 20 min. |
| 14–15 | do | 15 min. |
| 15–16 | do | 15 min. |
| 16–17 | do | 15 min. |
| 17–18 | do | 20 min. |
| 18–19 | do | 20 min. |
| 19–20 | do | 35 min. |

2. The method of manufacturing yeast which comprises propagating yeast in a nutrient solution, aerating the solution, during the period of yeast growth adding a nitrogenous yeast nutrient to the solution, adding equal quantities of yeast assimilable sugar to the solution at such intervals that the concentration of the yeast assimilable sugar in the solution goes through a succession of cycles, in each of which cycles there is an appreciable concentration of sugar, followed by a depletion of the sugar by the yeast cells, and then by an absence of yeast assimilable sugar, said intervals between additions of the sugar being approximately as follows:

| | | |
|---|---|---|
| 1–2 | addition | 1 hr. 10 min. |
| 2–3 | do | 1 hr. 5 min. |
| 3–4 | do | 45 min. |
| 4–5 | do | 45 min. |
| 5–6 | do | 30 min. |
| 6–7 | do | 30 min. |
| 7–8 | do | 30 min. |
| 8–9 | do | 30 min. |
| 9–10 | do | 30 min. |
| 10–11 | do | 30 min. |
| 11–12 | do | 20 min. |
| 12–13 | do | 20 min. |
| 13–14 | do | 20 min. |
| 14–15 | do | 15 min. |
| 15–16 | do | 15 min. |
| 16–17 | do | 15 min. |
| 17–18 | do | 20 min. |
| 18–19 | do | 20 min. |
| 19–20 | do | 35 min. |

EDMUND LEITH KITZMEYER.